United States Patent [19]

Lane, Jr.

[11] 4,414,386

[45] Nov. 8, 1983

[54] PRECIPITATION OF POLYCYCLOOLEFINS HAVING HIGH BULK DENSITY

[75] Inventor: Parley C. Lane, Jr., Cuyahoga Falls, Ohio

[73] Assignee: The B. F. Goodrich Company, Akron, Ohio

[21] Appl. No.: 376,369

[22] Filed: May 10, 1982

[51] Int. Cl.³ .............................................. C08F 6/12
[52] U.S. Cl. .................................. 528/496; 526/283; 528/495
[58] Field of Search ............................... 528/495, 496

[56] References Cited

U.S. PATENT DOCUMENTS 4,069,376  1/1978  Minchak ............................. 526/280

Primary Examiner—Stanford M. Levin
Attorney, Agent, or Firm—George A. Kap

[57] ABSTRACT

A polymer is precipitated from a cement containing the polymer dissolved in a nonpolar solvent by mixing the cement with a nonsolvent alcohol and water wherein the relative amount of water to the alcohol is different from the alcohol/water azeotropic composition and being such as to produce a polymer product in the form of discrete particles, the product having bulk density in excess of 0.08 g/cc or 5 lb/ft³, is capable of being easily filtered and dried, and is a polymer of a monomer that contains at least one norbornene group.

10 Claims, 1 Drawing Figure 4,414,386

PRECIPITATION OF POLYCYCLOOLEFINS HAVING HIGH BULK DENSITY

BACKGROUND OF THE INVENTION

In the solution ring opening polymerization of cycloolefins, the product discharged from the reactor is a honey-like cement that consists principally of a nonpolar carrier solvent in which the polymer is dissolved. The polymer content is normally on the order of about 15% by weight. The polymer can be any of the family of polymers that are made by homopolymerization or copolymerization of one or more of cycloolefins that contain the norbornene group. Polymerization can be conducted batchwise or continuously.

After the honey-like cement is prepared, it is necessary to separate the polymer from its carrier solvent. In the past, steam stripping has been used exclusively in plant operations to extract the polymer from the carrier solvent. In steam stripping, the cement is injected into a jet of steam that is directed into a vessel containing hot water. As contact is made between the cement and steam, the carrier solvent is flashed off as vapor, depositing the polymer in particle form in the hot water.

Steam stripping has a number of serious disadvantages. It produces a product of relatively large, coarse and variable particle size. The product contains a substantial amount of occluded water that makes it extremely difficult to dry. It produces a product that retains significant quantities of residual monomers and other impurities, all of which adversely affect the quality of the final product. Steam stripping has the inherent carry-over problem of polymer fines when the solvent vapor is discharged. This carry-over results in severe plugging in the solvent recovery system. Finally, stream stripping requires large volumes of steam, far in excess of that required to vaporize the solvent in order to produce a particulate product. Steam stripping, therefore, is an inefficient, expensive, and energy-wasteful operation.

It has been a common practice to reduce impurities in the polymers of cycloolefins by water washing the cements before steam stripping. In this way, effects of certain water-sensitive impurities are eliminated. Water washing has not been practical since large volumes of contaminated water were produced that had to be disposed without creating an environmental problem.

More recently, an alternate approach was discovered for isolating polymers of cycloolefins from the carrier solvent. Pursuant to this approach, the cement is mixed in a high shear mixer with a nonsolvent in the volume ratio of about 3 to 1 nonsolvent to cement whereby the polymer precipitates out. A nonsolvent is a liquid that is miscible with the nonpolar solvent that is used in the polymerization reaction but is a nonsolvent for the polymer. Examples of suitable nonsolvents include, ethanol, propanol, isopropanol, and the like, and they can be used with or without water. Although on some occasions this recovery procedure produced granular, easy-to-dry product having bulk density of about 0.144 g/cc or 9 lb/ft$^3$, these results could not be reliably reproduced. What was obtained normally was a clump-like product of fine, irregular fluffy microfibers that packed cotton-like when filtered and was difficult to dry and handle. The dry product normally had a bulk density below 0.08 g/cc or 5 lb/ft$^3$.

In a related patent application entitled "Precipitation of Polymeric Cycloolefins" by inventors Messrs. G. V. Wootton and L. P. Tenney, filed May 10, 1982 and bearing Ser. No. 376,367 an invention is disclosed which also relies on the use of a nonsolvent alcohol and water for precipitation of polycycloolefins. However, in that application, amount of water used relative to the nonsolvent alcohol generally corresponds to the azeotropic composition of water and the alcohol which facilitates recovery operations by making it possible to boil off the azeotrope.

SUMMARY OF THE INVENTION

This invention relates to the use of water with a nonsolvent to precipitate polycycloolefins from polymer cements comprising polycycloolefins and a nonpolar solvent thereof, the polycycloolefins having bulk density in excess of 0.08 g/cc or 5 lbs/ft$^3$ and preferably, are in a granular form comprising elongated particles of about 1 millimeter in length, the product being easier to dry and handle.

DETAILED DESCRIPTION OF THE INVENTION

Figure 1:
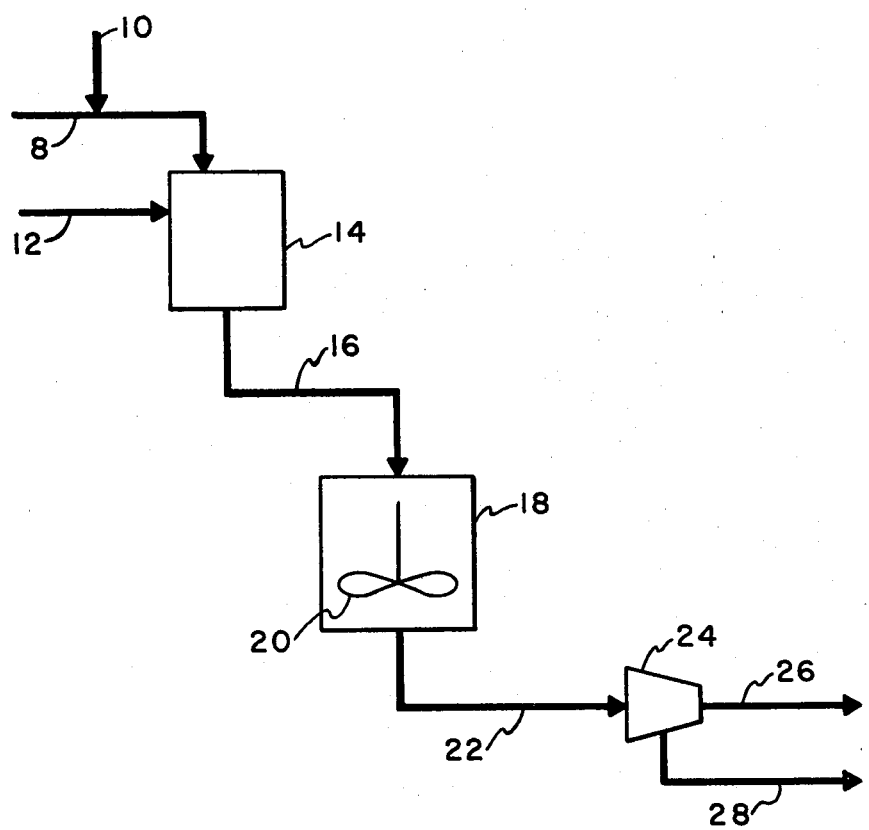
FIG. 1 is a flow diagram of the process contemplated herein that utilizes water with a nonsolvent alcohol to precipitate polymer cements containing polycycloolefins and nonpolar solvents that is achieved by mixing the polymer cement with water and an alcohol to precipitate the polymer and thus form a polymer slurry, conveying the slurry to a slurry tank where additional extraction of the polymer takes place, and then separating the polymer from the alcohol and the solvent.

The related application of inventors Wootton and Tenney, referred to earlier, discloses precipitation of polycycloolefins from polymer cements consisting essentially of polycycloolefins dissolved in a nonpolar solvent with water and a nonsolvent alcohol, the latter being a nonsolvent for the polymer but being miscible with the solvent. The relative amounts of water and alcohol generally correspond to the composition of the water-alcohol azeotrope which greatly facilitates recovery operations of the solvent and the alcohol by virtue of the fact that the azeotrope can be boiled off and recycled to the process. The product usually produced, however, has bulk density below 0.08 g/cc or 5 lb/ft$^3$, preferably about 0.13 to 0.2 g/cc or about 8 to 12 lb/ft$^3$, and is white and clump-like consisting of fine, irregular fluffy microfibers. The disadvantages of this product reside in that it packs like cotton when filtered, thus impeding the filtering operation by clogging the filters; is difficult to dry in that the drying time is too long; and is difficult to handle, such as in compounding thereof with other materials.

It has been unexpectedly discovered that the character of the product can be improved whereby bulk density is in excess of 0.08 g/cc or 5 lb/ft$^3$, preferably about 0.16 g/cc or 10 lb/ft$^3$. The product is more grainy, thus requires much less time to dry and is easier to handle and requires less storage space. Furthermore, efficiency of downstream blending and compounding operations is greatly enhanced.

To obtain the product with the desired characteristics, amount of water relative to the alcohol must be controlled. Based on experimental data, amount of water required will differ since it depends on the alcohol nonsolvent used and other variables such as molecular weight of the polymer, mixer design, precipitation temperature, and others. One general statement that applies in all cases tried is that the amount of water vis-a-vis alcohol is different from the amount of water present in the water-alcohol azeotrope. In most cases, amount of water needed is in excess of what is found in the water-alcohol azeotrope, however, in other cases it is less.

It should be recognized that the nonsolvent alcohol alone, without water, is capable of precipitating the polymer from the polymer cement. In such an instance, a stable slurry is formed with particles remaining in suspension, which makes separation thereof from the liquid phase cumbersome. This condition of the slurry is designated as stage A. This product is in the form of elongated microfibers that clump together and feel soft to the touch. Bulk density of such a product is low, and well below 0.08 g/cc or 5 lb/ft$^3$. As some water is added to the alcohol, such as about 90/10 to 80/20 weight ratio of isopropanol to water, the particles continue to remain in suspension and this slurry also corresponds to stage A.

Stage B is the optimum condition of the slurry, for purposes herein, and is characterized by the polymer particles settling to the bottom upon precipitation without sticking together. The particles are grainy, readily flowable, with particles being generally of elongated configuration and being about 0.1 mm in diameter and about 1 mm in length. Product produced under stage B conditions has bulk density of about 0.16 g/cc or 10 lb/ft$^3$ or higher. With isopropanol as the nonsolvent and a 90/10 copolymer of methyltetracyclododecene/-methyl norbornene with a DSV of 0.51 at 15% solids dissolved in cyclohexane, stage B conditions are achieved at nonsolvent to water weight ratio of about 75/25 to 65/35 at 7/1 weight ratio of the sum of alcohol and water to cement. Since composition of the isopropanol/water azeotrope is 87.4/12.6, it is apparent that amount of water needed to achieve stage B slurry condition is about twice as much as is contained in the azeotropic composition.

As more water is used with an alcohol to precipitate polymer from cement, stage C of slurry condition is reached whereby the particles settle out and tend to stick together, although, they can be reslurried on agitation. However, these particles stick together on filtration and cause plugging of the filter. With isopropanol, stage C is reached at the alcohol to water weight ratio of about 60/40.

When stage D of slurry condition is reached, the particles fuse together and cannot be reslurried by agitation. The fused particles form large chunks in the slurry tank and plug the slurry tank transfer lines. This condition was experienced at 80/20 ethanol to water weight ratio and with compositions containing more water. With a 96/4 weight ratio of ethanol/water in the azeotrope, it is apparent that the relative amount of water is well in excess of what is found in the ethanol-water azeotrope.

The process described herein is illustrated in FIG. 1 which shows ethanol in line 8 and water in line 10, as well as polymer cement stream in line 12, all being conveyed to mixer 14. Ethanol and water function as a precipitant or a coagulant for the dissolved polymer. In the context of describing the flow diagram of FIG. 1, ethanol is used as an example of a suitable nonsolvent and cyclohexane as an example of a suitable nonpolar cyclic solvent that is used in the polymerization of cycloolefins. The cement referred to herein is unpreconcentrated cement containing about 15% solids and consisting essentially of a polycycloolefin dissolved in cyclohexane. The mixer is a high shear, high intensity mixer, such as a 2" Eppenbach pipe mixer. Precipitation takes place in the mixer upon contact between the ethanol-water stream and the cement whereby a polymer slurry is formed comprising polymer particles dispersed in cyclohexane, water and ethanol.

From the mixer, polymer slurry stream is pumped through conduit 16 to slurry tank 18 where it is agitated to complete the extraction of the polymer. Precipitation can be effected at a temperature ranging from just above freezing to just below boiling of the polymer slurry, and it can easily take place at ambient temperature of about 20° C. However, to facilitate recovery of the solvent and the nonsolvent, or to facilitate recycle of an alcohol-water azeotrope as a coagulant, it is preferred to carry out precipitation at an elevated temperature near or above the boiling point of the alcohol-water azeotrope. This would permit the recovery of the azeotrope from a distillation column and its recycle to process with addition of supplemental water.

Operating the precipitation operation near or above the boiling temperature of the azeotrope is particularly advantageous in systems where amount of water used with alcohol to precipitate the polymer and obtain the desired product characteristics exceeds what is found in alcohol-water azeotropic composition. In such a case, as already explained, recovery is facilitated by boiling off the azeotrope and recycling it to process with supplemental water. In systems where amount of needed water, together with an alcohol, to obtain product of desired characteristics is less than that found in the alcohol-water azeotrope, and precipitation is carried out, near, or above the boiling temperature of the azeotrope and additional recovery steps must be taken, including extractive distillation, to recover the alcohol which is subsequently utilized in the precipitation operation with any amount of added water that produces the desired product.

If an optimum amount of water to ethanol is used, the polymer particles would tend to settle in the slurry tank, however, agitator 20 in the slurry tank keeps the polymer particles in suspension. From the slurry tank, the polymer slurry is conveyed via line 22 to centrifuge 24 where wet polymer is separated and removed through line 26 to be dried and the filtrate is removed through line 28 and pumped to recovery. The wet polymer contains about 50 to 60% by weight liquid and it is dried to less than 1% liquid in a separate drying operation. Without using the additional water as described herein, the wet product normally contains about 70 to 80% by weight of liquid.

The polymers described herein can be injection molded to produce machine parts, containers, electronic components, etc., or they can be extruded into profile shapes, sheets, rods, tubular products, and other mechanical products obtained by pressing, stamping, and other fabricating means. It should be understood, however, that prior to fabrication, the polymers described herein are compounded in a manner that is well known in the art with the usual compounding ingredients.

The polymers of cyclic olefins that contain the norbornene moiety can be made by ring opening polymerization of the cyclic olefins in the presence of a metathesis catalyst comprising at least one alkyl-aluminum halide cocatalyst and at least one tungsten or molybdenum compound catalyst. Tungsten and molybdenum in the metal compound catalyst can be the cation, such as in a tungsten or molybdenum halide, or the anion as in a tungstate or a molybdate. Polymerization is accomplished by mixing in a reactor a monomeric cyclic olefin, or a mixture thereof with or without other copolymerizable monomers, with cyclohexane nonpolar hydrocarbon solvent. A molecular weight modifier, selected from nonconjugated acyclic olefins, is then added to the reactor followed by an alkylaluminum halide cocatalyst and a tungsten or molybdenum compound catalyst. The polymerization reaction is conducted at 0° to 200° C., preferably 25° to 100° C., with stirring and produces little heat. Reaction time to completion is on the order of less than 2 hours. Reaction product that is recovered directly from the reactor is a smooth, viscous cement of honey-like consistency that comprises a polymer dispersed in a solvent. Polymer or solids concentration in the cement is about 15% and dilute solution viscosity of the polymer is normally in the range of about 0.1 to 3. Dilute solution viscosity is a measure of viscosity of a solution of 0.25 gram of polymer in one deciliter of toluene at 25° C. The polymer cement can be preconcentrated from about 15% solids to at least about 20% solids and up to about 80% solids. Preconcentration, which is optional, can be accomplished by mixing the cement with about 0.2 to 1 volume of a nonsolvent per 1 volume of cement. The nonsolvent is selected from various hydrocarbons including lower alcohols and azeotropes thereof with water.

The norbornene-type monomers of cycloolefins that can be polymerized in accordance with the process described herein are characterized by the presence of the following norbornene group defined by formula I, that can be substituted or unsubstituted:

(I)

Pursuant to this definition, suitable norbornene-type monomers include substituted and unsubstituted norbornenes, dicyclopentadienes, dihydrodicyclopentadienes, trimers of cyclopentadiene, and tetracyclododecenes. Preferred monomers of the norbornene-type are those defined by the following formulas II and III, each containing at least one norbornene group:

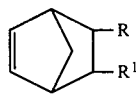 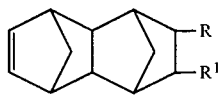

(II)        (III)

where R and $R^1$ are independently selected from hydrogen, alkyl, and aryl groups of 1 to 20 carbon atoms, and saturated and unsaturated cyclic groups of 3 to 12 carbon atoms formed by R and $R^1$ together with the two ring carbon atoms connected thereto. In a preferred embodiment, R and $R^1$ are independently selected from hydrogen and alkyl groups of 1 to 2 carbon atoms. Examples of monomers referred to herein include dicyclopentadiene, methyltetracyclododecene, 2-norbornene and other norbornene monomers such as 5-methyl-2-norbornene, 5,6-dimethyl-2-norbornene, 5-isopropyl-2-norbornene, 5-ethyl-2-norbornene, 5-butyl-2-norbornene, 5-hexyl-2-norbornene, 5-octyl-2-norbornene, and 5-dodecyl-2-norbornene.

Especially contemplated herein are homopolymers, copolymers and terpolymers of methylnorbornene, methyltetracyclododecene, and dicyclopentadiene, and preferably homopolymers of methyltetracyclododecene and copolymers of methyltetracyclododecene and methylnorbornene. The copolymers contain 1 to 75% by weight, preferably 10 to 30%, of polymerized methylnorbornene with remainder being methyltetracyclododecene whereas the terpolymers contain 1 to 75% by weight, preferably 1 to 45%, of polymerized methylnorbornene and 25 to 98% by weight, preferably 50 to 98%, of polymerized methyltetracyclododecene, with remainder being polymerized dicyclopentadiene. The norbornene-type monomers, or a mixture thereof can contain up to about 20% by weight of at least one other copolymerizable monomer.

Polymerization of cycloolefins can be conducted either batchwise or continuously. The precipitation processes described hereunder will perform equally well in either case, despite some differences in chemical make up of cements resulting from inherent kinetic differences existing between the two reaction modes. Continuous polymerization requires substantially less molecular weight modifier and catalyst and produces polymers of narrower molecular weight distribution than batch operation. For these and other practical considerations of a technical nature not important to the embodiment of this invention, continuous polymerization is the preferred method most regularly employed for process operations.

The preferred catalyst employed in the dispersion of cycloolefins is a combination of an aluminum halide with elemental halide or an alkylaluminum halide cocatalyst and a tungsten or a molybdenum compound catalyst. The tungsten and molybdenum in the metal compound catalyst can be the cation, such as in a tungsten or a molybdenum halide, or the anion, as in a tungstate or a molybdate.

The useful molybdenum and tungsten compound catalysts include molybdenum and tungsten halides such as molybdenum petachloride, molybdenum hexachloride, molybdenum pentabromide, molybdenum hexafluoride, molybdenum pentaiodide, tungsten hexachloride, tungsten hexafluoride, and the like. Preferred catalysts are the molybdenum halides, especially molybdenum pentachloride.

The alkylaluminum and aluminum halide cocatalysts are selected from alkylaluminum halides having the formulas $RAlX_2$, $R_2AlX$, $R_3Al_2X_3$, $R_3Al$, $AlX_3$, and mixtures thereof. In the formulas for the alkylaluminum halide catalysts, R is an alkyl radical containing 1 to 12 carbon atoms, preferably about 2 to 4 carbon atoms, and X is a halogen selected from chlorine, iodine, bromine and fluorine. Specific examples of such alkyl aluminum halides include ethylaluminum dichloride, diethylaluminum monochloride, ethylaluminum sesquichloride, diethylaluminum iodide, ethylaluminum diiodide, and trialkylaluminum compound with elemental iodine, propylaluminum dichloride, and propylaluminum diiodide.

Although aluminum is the preferred reducing agent in the alkylaluminum halide cocatalysts, other organometallic halide reducing agents can function as well. Metals that form suitable organometallic cocatalysts include lithium, magnesium, boron, lead, zinc, tin, silicon and germanium. Also, the metallic hydrides can be substituted in whole or in part for the organometallic cocatalysts.

The molybdenum or tungsten compound catalyst, or a mixture thereof, is employed at a level of about 0.01 to 50 millimoles molybdenum or tungsten per mole of total monomer, preferably 0.1 to 10 millimoles. The molar ratio of the alkylaluminum halide to the molybdenum and/or tungsten compound catalyst is not critical and can be in the range of about 200:1 or more to 1:10, preferably from 10:1 to 2:1 of aluminum to molybdenum or tungsten.

The use of polymerization reaction solvent in the process of this invention is required. Suitable nonpolar solvents, in which the polymers described herein are soluble, include aliphatic and cycloaliphatic hydrocarbon solvents containing 4 to 10 carbon atoms such as butane, pentane, hexane, heptane, octane, cyclohexane, cyclohexene, cyclooctane and the like; aromatic hydrocarbon solvents containing 6 to 14 carbon atoms which are liquid or easily liquified such as benzene, toluene, naphthalene and the like; and substituted hydrocarbons wherein the substituents are inert, such as dichloromethane, chloroform, chlorobenzene, dichlorobenzene, and the like. Cyclohexane was found to be an excellent solvent. The solvent can be added at any point in the charging procedure, but a portion, preferably 0.1 to 10% of the total solvent, is used to dissolve the catalyst and the remainder added before the catalyst solution. Generally, ½ to 2 liters of solvent is used per 100 grams of monomer.

A polymerization activator can be used but is generally not needed. Activation can be obtained by using air or peroxide or a hydroperoxide, especially the organic peroxides such as benzoyl peroxide. The activator can be employed in the range of up to 3 moles, preferably up to 1 mole, per mole of the alkylaluminum halide cocatalyst. The activator can be added at any point in the charging procedure but is preferably added last or with the tungsten or molybdenum compound catalyst.

At least one nonconjugated acyclic olefin can be used as a molecular weight modifier having at least one hydrogen on each double-bonded carbon atom and containing 2 to 12 carbon atoms, more preferably 3 to 8 carbon atoms. Examples of suitable acyclic olefins include 1-olefins, 2-olefins, 3-olefins, preferably 1-olefins containing 3 to 8 carbon atoms such as 1-butene, 1-hexane, 1-pentene, 3-methyl-1-butene, and the like. In the process of this invention, it is important that the acyclic olefin employed boil at or below the boiling temperature of the water-nonsolvent binary azeotrope either by itself or in azeotropic composition with other system components present in the slurry tank.

The nonconjugated acyclic olefin can be used at a level of about 0.0001 to 1 mole per mole of the monomer charge. The nonconjugated acyclic olefin can be charged directly or in solution at any point in the charging procedure, but it is preferably charged along with the monomers. When charged last, the nonconjugated acyclic olefin is preferably charged before the reaction begins.

The monomers can be added at any point in the charging procedure. Normally, however, for continuous polymerization, the monomers, the solvent and the nonconjugated acyclic olefin are added to the reactor as a mixture together with the alkylaluminum halide cocatalyst. The tungsten or molybdenum compound catalyst is added separately in a hydrocarbon solvent. Completion of the polymerization reaction is indicated by the disappearance of the monomer in the charge, as monitored by gas chromatography.

The nonsolvent that is used with water to coagulate the polymer in the cement is a liquid that is miscible with the nonpolar solvent used in the polymerization reaction of the monomers containing the norbornene group. However, the nonsolvent is not a solvent for the polymer. Suitable nonsolvents include alcohols containing 2 to 8 carbon atoms, preferably lower alkyl alcohols of about 2 to 5 carbon atoms. Specific examples of suitable nonsolvents include ethyl alcohol, propyl alcohol, allyl alcohol, n-propyl alcohol, isopropyl alcohol, butyl alcohol, isobutyl alcohol, sec-butyl alcohol, t-amyl alcohol, and the like. Preferred nonsolvents are the lower saturated and unsaturated alcohols containing 2 to 5 carbon atoms that form azeotropes with water. Examples of such azeotropes include ethanol-water azeotrope containing 4% water by weight, isopropanol-water azeotrope containing about 12.5% water, n-propanol-weight azeotrope containing 28.3% water, allyl alcohol-water azeotrope containing 27.7% water, propanol-water azeotrope containing 28.3% water, butanol-water azeotrope containing 42.5% water, sec-butanol-water azeotrope containing 27.3% water, isobutanol-water azeotrope containing 33% water, and t-amyl alcohol-water containing 27.5% water.

The volume ratio of nonsolvent and water as precipitant or coagulant to cement can vary from about 2/1 to 15/1, preferably 3/1 to 8/1, for 15% total solids polymer cements and higher ratios for preconcentrated cements, normally about 10/1 on weight basis. Process economies strongly favor the lower end of the range, although at higher levels, coalescence of polymer particles in subsequent process steps is reduced. Amoung of the coagulant will also depend on solids concentration of the cement, with the more concentrated cement requiring more coagulant. For instance, if preconcentrated cement is used that contains about 25% solids, the weight ratio of alcohol and water to cement can vary from about 5/1 to 10/1.

It is desired to use an amount of water, together with the alcohol, that produces polymer product with optimum product characteristics that have already been described as grainy, non-sticky, and of high bulk density on the order of 10 lb/ft$^3$ and above. This amount of water is defined herein in terms of stage B condition of slurry. It has already been disclosed that the optimum amount of water needed, relative to the alcohol, can be below or above what is found in an alcohol-water azeotrope. For instance, in the case of ethanol, optimum amount of water relative to ethanol is about 10/90 weight parts when using the weight ratio of 7/1 of coagulant to cement, coagulant, of course, being the combined weight of ethanol and water used in the precipitation operation. Under these conditions, the particles settle to the bottom, are not sticky, and can be reslurried by agitation. It should be understood that, in the context of the process described in connection with FIG. 1 wherein an agitator is shown in the slurry tank, the polymer particles would be maintained in suspension. Bulk density of the polymer product formed from 90/10 weight ratio methyltetracyclododecene and methyl norbornene having DSV of 0.51, was about 0.105 g/cc or about 7 lb/ft$^3$. The optimum weight ratio of ethanol to water is 90/10. Since ethanol/water azeotropic weight ratio is 96/4, this indicates that additional water must be added to the recycled ethanol and water in azeotropic proportion to obtain the desired product when using ethanol as the nonsolvent. The ethanol-water azeotrope boils at 78° C., at standard conditions.

The optimum weight ratio of isopropanol to water to attain stage B of the slurry condition is from about 75/25 to about 70/30, at the same conditions discussed above. Isopropanol forms an azeotrope with water at 87.4/12.6 weight ratio of isopropanol to water and boils at 80° C. It should be apparent that additional water would be added to the recycled isopropanol and water in azeotropic proportion to obtain the desired product. Stage C of the slurry condition is attained at weight ratio of about 60/40 isopropanol to water and the main difference between stage B and stage C products resides in the fact that particles of stage B product are not sticky whereas particles of stage C product are sticky but can be reslurried with agitation.

Experience with n-propanol as a nonsolvent shows that it behaves differently in one major respect from the other alcohols tried in the precipitation of the polymer cement. The azeotrope of n-propanol and water boils at 88° C. and its weight ratio is 71.7/28.3 n-propanol to water. It is interesting to observe that the optimum weight ratio of alcohol to water to attain stage B of the slurry condition is about 80/20, which contains less water than the n-propanol-water azeotrope. Even stage C of the slurry condition is achieved at weight ratio of 75/25 of n-propanol to water, which contains less water than the n-propanol-water azeotrope. This peculiarity of n-propanol, and other such nonsolvents, means that if precipitation is carried out near or above the boiling temperature of the azeotrope, extractive distillation might be employed to separate n-propanol so that it can be used in the desired ratio with water to produce the desired product. Since the azeotropic composition contains too much water, it should be apparent that recycling it to the process for precipitation purposes will not yield the desired product.

It is intended herein to cover the use of alcohol and water in weight ratios that yield products with desired characteristics but excluding azeotropic compositions of alcohol and water. More specifically, it is intended to cover the use of alcohol-water weight ratios in precipitation of polymer cements that yield stage B and stage C conditions of the slurry, as defined above.

The precipitation, extraction, and recovery processes described hereunder may be conducted either in batch-wise segments or wholly continuously as shown in the accompanying FIG. 1. For practical and technical reasons not important to the embodiment of this invention, continuous mode is the preferred method most regularly employed for process operations.

The following example illustrates the invention disclosed herein in reference to the use of specific materials and operating conditions.

EXAMPLE

This example demonstrates the use of water with ethanol, n-propanol and isopropanol to precipitate methyltetracyclododecene/methylnorbornene (MTD/MNB) 90/10 copolymer, on weight basis, having dilute solution viscosity (DSV) of 0.51 from polymer cement containing about 15% solids and consisting essentially of the copolymer dissolved in cyclohexane.

The experiments were conducted by feeding continuously the polymer cement, alcohol and water to a 2"-diameter Eppenbach high intensity pipeline mixer and the polymer slurry from the mixer was fed to a slurry tank. Polymer slurry consisted essentially of precipitated copolymer dispersed in a liquid medium containing cyclohexane, alcohol, and water. Feed rates were set at the desired conditions and after steady state conditions were attained, samples of the slurry were taken through a sample port located between the mixer and the slurry tank. The slurry samples were stored in glass jars overnight and the next day were filtered using a lab filter and then were dried in a vacuum oven. The bulk densities were measured using a weighed graduated cylinder. It was the objective of these experiments to obtain a less fibrous, higher bulk density particulate product that can be easily filtered without sticking together. Additionally, it is desireable to have a higher bulk density product for drying and compounding operations. The results are set forth in Table I, below:

TABLE I

| Run No. | Feed Rate, kgm/min. | | | Alc./H$_2$O | Alc. + H$_2$O Cement | Bulk Density Dried Polymer gm/cc | Characteristic of the slurry |
|---|---|---|---|---|---|---|---|
| | Cement | Alcohol | Water | | | | |
| | | | | n-Propanol | | | |
| 1 | .45 | 3.18 | 0.0 | 100 | 7/1 | .048 | A |
| | .45 | 2.86 | .32 | 90/10 | 7/1 | .048 | A |
| | .45 | 2.54 | .64 | 80/20 | 7/1 | .1210 | B |
| | .45 | 2.38 | .79 | 75/25 | 7/1 | .1450 | C |
| | .45 | 2.22 | .95 | 70/30 | 7/1 | — | D |
| | | | | Ethanol | | | |
| 2 | .45 | 3.18 | 0.0 | 100 | 7/1 | .48 | A |
| | .45 | 2.86 | .32 | 90/10 | 7/1 | .1046 | B |
| | .45 | 2.54 | .64 | 80/20 | 7/1 | — | D |
| | .45 | 2.38 | .79 | 75/25 | 7/1 | — | D |
| | .45 | 2.38 | .79 | 75/25 | 7/1 | — | D |
| | .45 | 2.22 | .95 | 70/30 | 7/1 | — | D |
| | | | | Isopropanol | | | |
| 3 | .45 | 3.18 | 0.0 | 100 | 7/1 | .048 | A |
| | .45 | 2.86 | .32 | 90/10 | 7/1 | .048 | A |
| | .45 | 2.54 | .64 | 80/20 | 7/1 | .048 | A |
| | .45 | 2.38 | .79 | 75/25 | 7/1 | .0591 | B |
| | .45 | 2.22 | .95 | 70/30 | 7/1 | .1708 | B |
| | .45 | 1.91 | 1.20 | 61/39 | 7/1 | .1764 | C |

Note:
alcohol to water ratio and the sum of alcohol and water to cement are on weight basis.

In the above table, the character or condition of the slurry after standing overnight is defined as follows:

A—stable slurry, particles stay in suspension
B—particles settle to the bottom but do not stick together
C—particles settle to the bottom but can be reslurried with agitation
D—particles fused together As should be apparent from the above results, amount of water needed to obtain a given bulk density varies with the type of alcohol used in the precipitation. For n-propanol, the optimum water level is about 15 to 25%, which amount is less than the n-propanol/water azeotropic composition of 71.7/28.3 boiling at 88° C. For ethanol, optimum level of water is about 10%, which is above the ethanol/water azeotropic composition boiling at 78° C. Same is true for isopropanol: the optimum water level is about 25 to 40%, which is above its isopropanol/water azeotropic composition of 87.4/12.6 boiling at 80° C. During the ethanol run, problems with plugging of the mixer were encountered at alcohol/water levels of 80/20, 75/25 and 70/30.

Other factors, such as polymer molecular weight, solids concentration of the cement, mixer design, and temperature can affect density and configuration of the product. For this reason, water is added on line so that small adjustments in the water level can be made to compensate for these and other variables.

I claim:

1. Process for precipitating a polymer from a cement comprising said polymer dissolved in a solvent, said process comprising mixing said cement with a sufficient amount of a nonsolvent alcohol containing 2 to 8 carbon atoms and water to precipitate said polymer thus forming a polymer slurry containing said polymer solids dispersed in a liquid medium containing said solvent, water, and said nonsolvent alcohol, and separating said polymer from said liquid medium, amount of water relative to said nonsolvent alcohol being different from the azeotropic composition of said alcohol and water but being in relative proportion necessary to produce product in the form of discrete particles having bulk density in excess of 0.08 g/cc that can be easily filtered and dried, and said polymer is a reaction product formed by ring opening polymerization of at least one norbornene-type monomer.

2. Process of claim 1 wherein the relative amount of said alcohol and water to said cement is in the range of about 2/1 to 15/1, on volume basis, and wherein said solvent is miscible with water and said nonsolvent alcohol.

3. Process of claim 2 wherein said polymer has dilute solution viscosity of about 0.1 to 3 and it is selected from homopolymers, copolymers and terpolymers of methylnorbornene (MNB), methyltetracyclododecene (MTD), and dicyclopentadiene (DCPD).

4. Process of claim 2 wherein said cement is selected from nonpreconcentrated cements containing about 15% solids and preconcentrated cements containing at least about 20% solids.

5. Process of claim 3 wherein said alcohols are selected from saturated and unsaturated lower alcohols containing 2 to 5 carbon atoms, said precipitation being accomplished in the temperature range from above freezing to below boiling temperatures of the system.

6. Process of claim 5 wherein said copolymers contain 10 to 30% weight polymerized MNB with remainder being polymerized MTD and said terpolymers contain 1 to 45% by weight polymerized MNB, 50 to 98% by weight polymerized MTD, with remainder being polymerized DCPD.

7. Process of claim 5 wherein said solvent is selected from cyclic nonpolar solvents and wherein the relative amount of said alcohol and water to said cement is in the range of about 3/1 to 8/1, and said precipitation takes place at a temperature of approximately corresponding to the boiling point of the alcohol/water azeotrope.

8. Process of claim 6 wherein said alcohol is selected from ethanol, isopropanol, n-propanol, and mixtures thereof and the amount of said alcohol to water being about 90/10 for ethanol, about 80/20 to 60/40 for isopropanol and about 80/20 to 75/25 for n-propanol, all on a weight basis.

9. Process of claim 6 wherein the relative amount of said alcohol to water is such as to produce a slurry condition selected from B and C, after standing overnight, wherein the slurry conditions are defined as follows:
B—particles settle to the bottom but do not stick together
C—particles settle to the bottom and tend to stick together but can be reslurried with agitation.

10. Process of claim 9 wherein the relative amount of said alcohol to water is such as to produce slurry condition B; wherein said solvent is selected from cyclohexane, toluene, and benzene; and bulk density of said polymer is about 0.13 to 0.2 g/cc.

* * * * *